US009586579B1

(12) United States Patent
Laskowsky et al.

(10) Patent No.: US 9,586,579 B1
(45) Date of Patent: Mar. 7, 2017

(54) SYSTEM AND METHOD FOR MONITORING BATTERY DEGRADATION

(71) Applicant: GM GLOBAL TECHNOLOGY OPERATIONS LLC, Detroit, MI (US)

(72) Inventors: Patricia M. Laskowsky, Ann Arbor, MI (US); Patrick E. Frost, Berkley, MI (US); Rory B. Fraga, Troy, MI (US); Eugenie T. Abboud, Novi, MI (US); Todd P. Lindemann, Howell, MI (US); Mark D. Miller, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/056,191

(22) Filed: Feb. 29, 2016

(51) Int. Cl.
*B60W 20/13* (2016.01)
*G06F 3/0488* (2013.01)
*G06F 3/0481* (2013.01)
*G06F 3/0484* (2013.01)
*B60K 6/20* (2007.10)
*B60K 35/00* (2006.01)
*G06Q 30/02* (2012.01)

(52) U.S. Cl.
CPC ............. *B60W 20/13* (2016.01); *B60K 6/20* (2013.01); *B60K 35/00* (2013.01); *G06F 3/04817* (2013.01); *G06F 3/04847* (2013.01); *G06F 3/04886* (2013.01); *G06Q 30/0239* (2013.01); *G06Q 30/0277* (2013.01); *B60K 2350/1072* (2013.01); *B60W 2510/244* (2013.01); *B60W 2710/06* (2013.01); *B60Y 2200/92* (2013.01); *B60Y 2300/182* (2013.01); *B60Y 2300/43* (2013.01); *B60Y 2300/91* (2013.01); *Y10S 903/903* (2013.01)

(58) Field of Classification Search
CPC .......... B60W 20/13; B60W 2510/244; B60W 2710/06; B60K 6/20; B60K 35/00; B60K 2350/1072; G06F 3/04817; G06F 3/04847; G06F 3/04886; G06Q 30/0239; G06Q 30/0277; B60Y 2200/92; B60Y 2300/182; B60Y 2300/43; B60Y 2300/91; Y10S 903/903
See application file for complete search history.

(56) References Cited

U.S. PATENT DOCUMENTS

2013/0179061 A1\* 7/2013 Gadh ................. B60L 11/1842
701/123
2014/0278167 A1 9/2014 Frost et al.

\* cited by examiner

*Primary Examiner* — Michael D Lang
(74) *Attorney, Agent, or Firm* — Quinn Law Group, PLLC

(57) ABSTRACT

A system for use with a battery and sensors operable for measuring battery data includes an interactive user interface and a controller programmed with battery degradation monitoring logic for estimating a state of the battery. As part of a method, the controller identifies data bins for which measured state of charge range-based battery performance data is missing or dated/stale, and automatically prompts an operator to execute an assigned task corresponding to the identified data bins. The controller records the battery performance data for the identified data bins upon completion of the assigned task, estimates the state of the battery using the recorded battery performance data and the battery degradation monitoring logic, and executes a control action with respect to the system using the estimated state. A virtual or actual reward feature may be displayed in response to completion of the assigned task.

18 Claims, 4 Drawing Sheets

SYSTEM AND METHOD FOR MONITORING BATTERY DEGRADATION

TECHNICAL FIELD

The present disclosure relates to a system and method for monitoring battery degradation.

BACKGROUND

High-voltage energy storage systems may be used to power electric machines in a variety of systems. For instance, output torque from the electric machines may be used to power an input member of a transmission in certain power plants, as well as in hybrid electric, battery electric, and extended-range electric vehicles. However, as the individual battery cells of the energy storage system age and degrade, battery performance parameters such as cell capacity, open circuit voltage, resistance, and state of charge may change relative to calibrated/new values. As a result, battery degradation may be monitored by a designated controller to determine the amount of electrical energy remaining in the various battery cells. From the remaining electrical energy, estimates can be generated of other values, such as a remaining electric operating range for the various vehicles noted above. The estimated electric operating range can be used by an operator for route planning, and/or by an onboard controller to execute powertrain control actions.

SUMMARY

A system is disclosed herein for monitoring degradation of a multi-cell battery in an optimal manner. The system includes sensors, an interactive user interface, and a controller in communication with the sensors and user interface. The controller is programmed to monitor battery degradation in an optimal manner via the user interface. As described herein, the user interface may be controlled in such a manner as to visually encourage certain driving and/or charging behavior.

For instance, the user interface may automatically prompt an operator of a vehicle with an objective or task, such as to vary a duration of a given drive cycle, change an electric charging start/stop time, and/or extend or decrease time between charging events. The operator, upon accepting a prompted task, enables the controller to collect battery performance data in state of charge-based regions of a drive or charge cycle that might not otherwise be collected, or that may not be collected as frequently as needed for optimal monitoring or tracking of battery degradation. The user interface described herein is therefore intended to allow the operator to be closely involved with overall vehicle operation in a highly visual, intuitive, and interactive manner, with the completion of any prompted tasks possibly being rewarded by the controller via virtual or actual reward features.

A system in accordance with an embodiment of the disclosure may be used with sensors operable for measuring battery performance data of the battery. The system may include the interactive user interface and controller noted above, with the controller programmed to monitor battery degradation and estimate a state of the battery. The controller is further programmed to identify state of charge range-based data bins for which the measured battery performance data is unsatisfactory, for instance missing or dated/stale i.e., older battery performance data that may no longer be indicative of the present energy level of the battery. The controller automatically prompts an operator, via control of the interactive user interface, to execute an assigned task corresponding to the identified "unsatisfactory" data bins, and then records the measured battery performance data for the identified data bins upon completion of the assigned task. Furthermore, the controller is programmed to estimate the state of the battery using the recorded measured battery performance data, and to thereafter execute a control action with respect to the system using the estimated state.

A method is also disclosed herein for optimal monitoring of battery degradation in a system having the battery and sensors described above. The method includes determining, via the controller, if the battery performance data is missing or stale, including evaluating a plurality of battery data bins, each configured to store the measured battery performance data for a predetermined state of charge range of the battery, to determine if sufficient data has been collected for each bin in a timely manner, e.g., relative to a threshold. The method also includes displaying, via the interactive user interface, a prompt to an operator to accept an assigned task corresponding to a data bin in which the battery performance data is missing or stale. In this manner, the controller automatically prompts the operator to execute the assigned task.

Additionally, the method may include detecting whether the operator has accepted the assigned task, and then recording the battery performance data for the data bin corresponding to the accepted task in response to detection of the acceptance. The controller then estimates a state of the battery using the recorded battery performance data as part of the method before executing a control action with respect to the system using the estimated state.

The above noted and other features and advantages of the present disclosure are readily apparent from the following detailed description of the best modes for carrying out the disclosure when taken in connection with the accompanying drawings.

DETAILED DESCRIPTION

Figure 1:
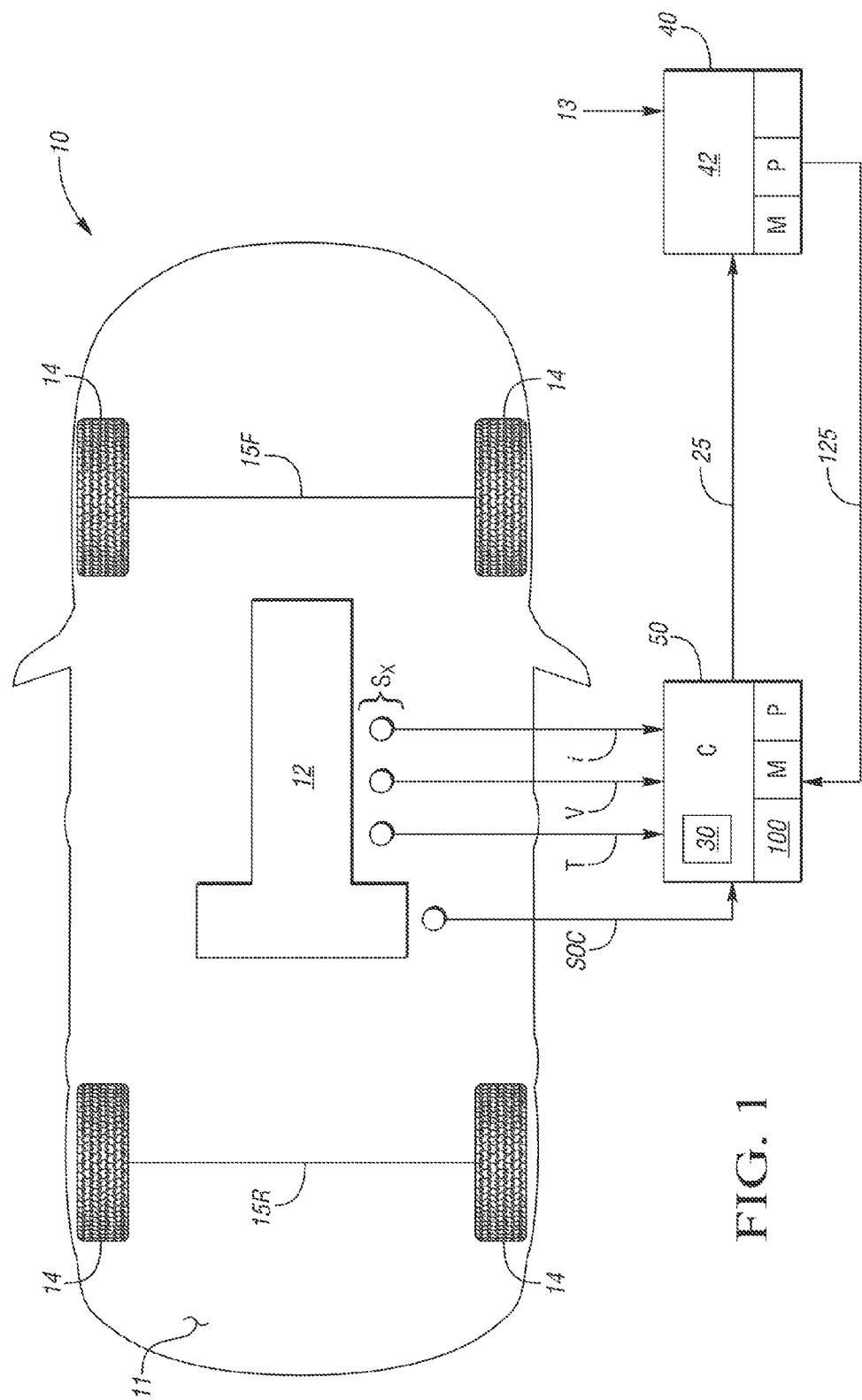
FIG. 1 is a schematic illustration of an example vehicle having a battery, an interactive user interface, and a controller programmed to encourage driver behavior that optimizes the monitoring of battery degradation as set forth herein.

Referring to the drawings, wherein like reference numerals are used to identify like or identical components in the various views, FIG. 1 schematically illustrates an example vehicle 10 having a chassis 11, a battery 12, a display device 40 having an interactive user interface 42, and a controller (C) 50 programmed with a set of battery degradation monitoring logic 30 of the type noted above. As explained below with reference to FIGS. 2-5, the controller 50 and the interactive user interface 42 are collectively programmed to encourage particular behavior of an operator of a given system such as the vehicle 10, and to visually prompt the operator to vary a particular behavior, for instance by changing a duration of a given drive cycle, charging event, electric charge start/stop time, or rest time of the vehicle 10 or other system having the battery 12.

Use of the interactive user interface 42 is intended to enable battery performance data to be collected in all required state of charge ranges or regions, including those that might not otherwise be collected with the frequency necessary for accurately monitoring or tracking battery degradation via the logic 30. While the vehicle 10 of FIG. 1 is shown as an example of the type of system that would benefit from the present disclosure, those of ordinary skill in the art will appreciate that the disclosed approach could be extended to any rechargeable electrical system, such as a computer, robot, or the like, employing battery degradation monitoring logic 30 to estimate a remaining battery capacity or electric operating range. For illustrative consistency, the vehicle 10 of FIG. 1 will be described hereinafter without limiting the scope to such an embodiment.

The vehicle 10 may be embodied as a hybrid electric vehicle, a battery electric vehicle, an extended-range electric vehicle, or any other mobile platform using electrical energy from the battery 12 to power one or more electric machines (not shown). The electric machine(s) may be operable for delivering output torque to front and/or rear drive wheels 14 of the vehicle 10 arranged on front or rear drive axles 15F or 15R to propel the vehicle 10 using electrical energy from the battery 12. Although omitted for simplicity, the vehicle 10 may include other powertrain components, e.g., an internal combustion engine or gas generator in certain hybrid electric vehicle configurations.

The vehicle 10 also includes battery sensors $S_x$ each operable for measuring or otherwise determining a corresponding battery performance parameter of the battery 12. For instance, the various battery sensors $S_x$ may determine a state of charge (arrow SOC), battery temperature (arrow T), a battery voltage (arrow V), and/or a battery current (arrow i) of individual battery cells or groups of battery cells (not shown) of the battery 12, with such values transmitted or otherwise reported to the controller 50. The controller 50 uses the battery performance parameters in the battery degradation logic 30 to determine the amount of electrical energy remaining in the battery 12.

For instance, the controller 50 may automatically determine the voltage (arrow V) as an open-circuit voltage (OCV) after the vehicle 10 is at rest for a calibrated duration, i.e., when the powertrain of the vehicle 10 is off. Use of the battery degradation monitoring logic 30 may entail, e.g., comparing a shape of a measured OCV curve against a calibrated/new OCV curve, and thereby estimating the amount of energy remaining in the battery 12, and thus estimating an electric vehicle (EV) range of the vehicle 10.

The calculation and display of an estimated EV range to an operator of a vehicle having an electric powertrain, such as the example vehicle 10 of FIG. 1, is an important part of minimizing operator range anxiety. Such range anxiety is an underlying cause of gaps in the range of battery performance data typically collected and made available to the battery degradation monitoring logic 30. That is, operators tend to operate within a particular range of a charging station, or tend to charge the battery 12 when the battery 12 remains at a relatively high energy level, in order to avoid the possibility of depleting the battery 12. Such a scenario is analogous to that of an operator of a conventional vehicle always refilling a fuel tank when the fuel tank remains half full, or that of charging a laptop computer when the state of charge remains well above 50%. Optimization of the battery degradation monitoring logic 30 as set forth herein thus enables an operator to plan a drive route with respect to available charging stations with a higher degree of confidence in the estimated range.

The interactive user interface 42 and the controller 50 of FIG. 1 may be embodied as one or more distinct devices, each possibly having one or more microcontrollers or central processing units (P) and memory (M), e.g., read only memory, random access memory, and electrically-erasable programmable read only memory. The controller 50 and interactive user interface 40 may include a high-speed clock, input/output circuitry, and/or any other circuitry that may be required to perform the functions described herein. In different configurations, the interactive user interface 42 and the controller 50 may be the same or separate devices. The controller 50 may be configured to run/execute various software programs, including the battery degradation monitoring logic 30. The interactive user interface 42 may be configured to receive battery information (arrow 25) from the controller 50 describing data regions or bins in which the OCV or other collected battery performance data is minimal, old or stale, or entirely absent, and to render or output a data stream (arrow 125), some of which is capable of being selectively displayed, e.g., via the user interface 42 or by the controller 50.

Figure 2:
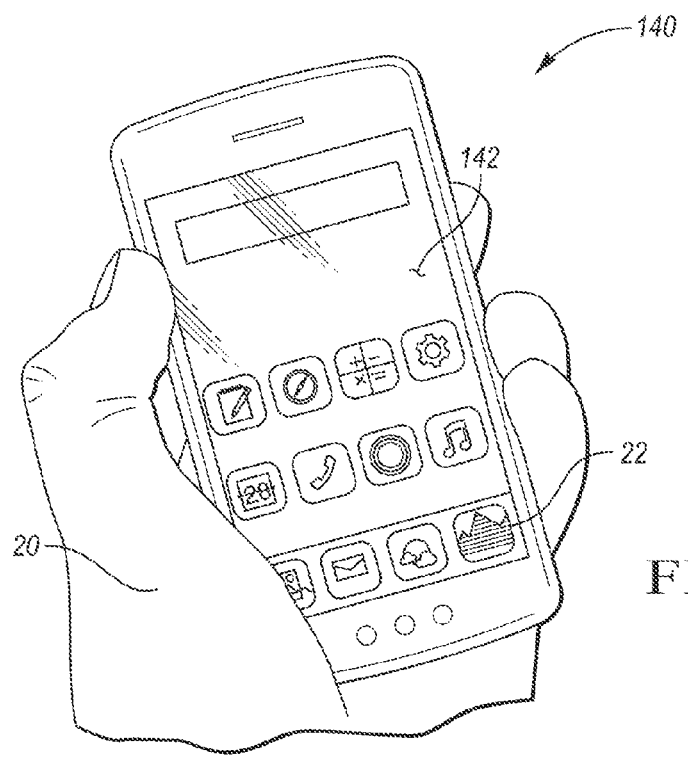
FIG. 2 is a schematic illustration of an example screen and range seeker icon of an interactive user interface.

The interactive user interface 42 and controller 50 may be digitally interconnected with the memory (M), and may be configured to retrieve and execute such software applications in a manner that is known in the art. Likewise, the user interface 42 may include a liquid crystal display (LCD), a light emitting diode display (LED), an organic light emitting diode display (OLED) and/or any similar style display/monitor that may exist or that may be hereafter developed. In different embodiments, the user interface 42 may be a touch-sensitive screen of a navigation or infotainment system located in a center stack (not shown) of the vehicle 10, and/or of a cell phone or other portable electronic device as shown in FIG. 2. That is, a capacitive or touch-based digitizer may be integrated within the user interface 42 and operable to detect contact from an operator as an input signal (arrow 13) and automatically convert the digitized contact into the data stream (arrow 125). An image, text, or other graphic representative of the data stream (arrow 125) may be presented to the operator via the user interface 42 and provided to the controller 50 for use in optimizing the performance of the battery degradation monitoring logic 30, and/or retained by the interactive user interface 42 for optional virtual or actual reward features as set forth below with reference to FIG. 5.

FIG. 2 depicts an example display device 140 having a user interface 142. For instance, the display device 140 may be a cell phone held in a hand 20 of an operator of the vehicle 10 of FIG. 1, while the user interface 142 is embodied as a touch-screen of the display device 140. To participate in the optimization of the battery degradation monitoring logic 30 of FIG. 1, the operator may simply touch an icon 22 to initialize the method 100. The icon 22 may be labeled with descriptive text such as "Range Seeker" or "Calibration Optimizer", or with a descriptive logo or illustration as shown, with the icon 22 and underlying method 100 possibly being available as application that an operator can download to the controller 50 and/or to the interactive user interface 42 and/or 142. In response to a touching of the icon 22, the controller 50 thereafter identifies drive or charging cycle that lack sufficient battery performance data, or that have older or "stale" data that no longer accurately describes the present state of the battery 12.

Non-limiting example tasks include delaying charging of the battery 12 for a predetermined duration, with an on-screen timer possibly used to facilitate the task, intermittently pausing a charging process at different points of a charging cycle so as to collect battery performance data at various states of charge, or driving a certain distance without charging the battery 12 until a battery state of charge reaches a particular level. As noted above, some battery performance data may not be collected absent specific prompting by the controller 50, given the typical range anxiety or normal driving/charging patterns of operators of electrified vehicles. Therefore, the controller 50 may also prompt the operator to be cognizant of their destination and nearest charging location before accepting a given task, or the controller 50 can proactively consider the availability of such charging stations as a condition for generating the task.

In response to selection of the icon 22, the controller 50 may display a visual prompt to the operator via the user interface 42 and/or 142. For instance, a text prompt may be displayed such as "Your mission, if you choose to accept it, is to drive at least 4 consecutive miles without turning off your vehicle and then turn the vehicle off for at least 2 hours." The operator can then click an "accept" icon to initiate collection of battery performance data corresponding to this task. Progress of such an example task may then be displayed, e.g., as shown in FIG. 3 as designated text area 32 containing suitable text informing the operator as to the progress of the task.

The designated text area 32 may be populated with suitable text such as "Mission accepted! You may begin. Use the completion bar below to track your progress." A status bar 34 located near the designated text area 32 may graphically indicate the progress of the accepted task, e.g., as a gradually-filled or shaded status bar 34 having a range [0-X] as shown, with "X" representing a particular duration, driving distance, or other target. The status bar 34 may disappear from the user interface 42 when the assigned task is complete, and the text message displayed in the designated text area 32 may change to an appropriate message such as "Mission completed! You have successfully collected data that will be used to improve the accuracy of your battery state estimator. Return to this app later for future improvement opportunities."

If the operator is unable to complete an assigned task once the task has been accepted, a different text message may be displayed, e.g., "Oops! Your last mission was interrupted. Good news, another mission is available! Please press "Accept" to begin." A new task can then be automatically assigned by the controller 50, such as "Delay charging for at least 45 minutes. By pressing "Accept", your charging will automatically start 45 minutes after the next time you plug in." The particular task is dependent upon the data that is stale or missing for the particular battery 12 being evaluated.

Figure 3:
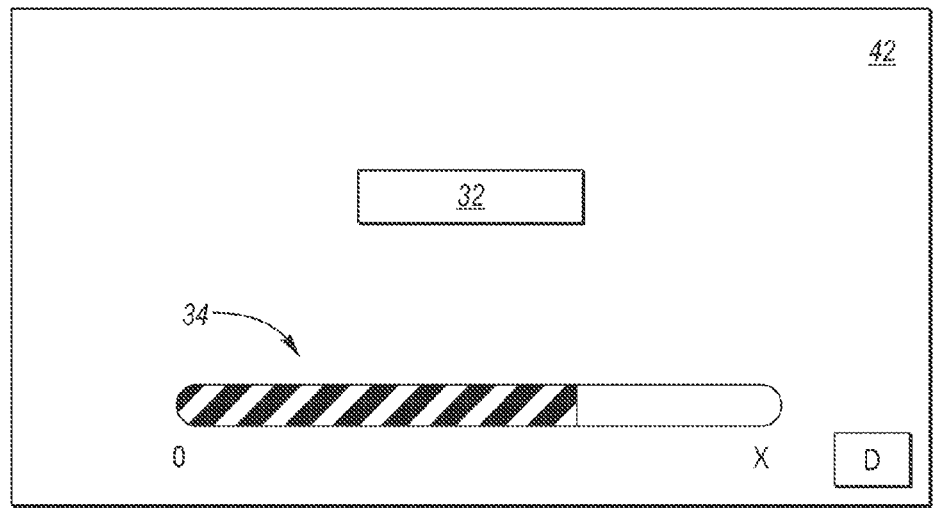
FIG. 3 is a schematic diagram of an example second screen of the interactive user interface depicting an example progress bar.
Figure 4A:
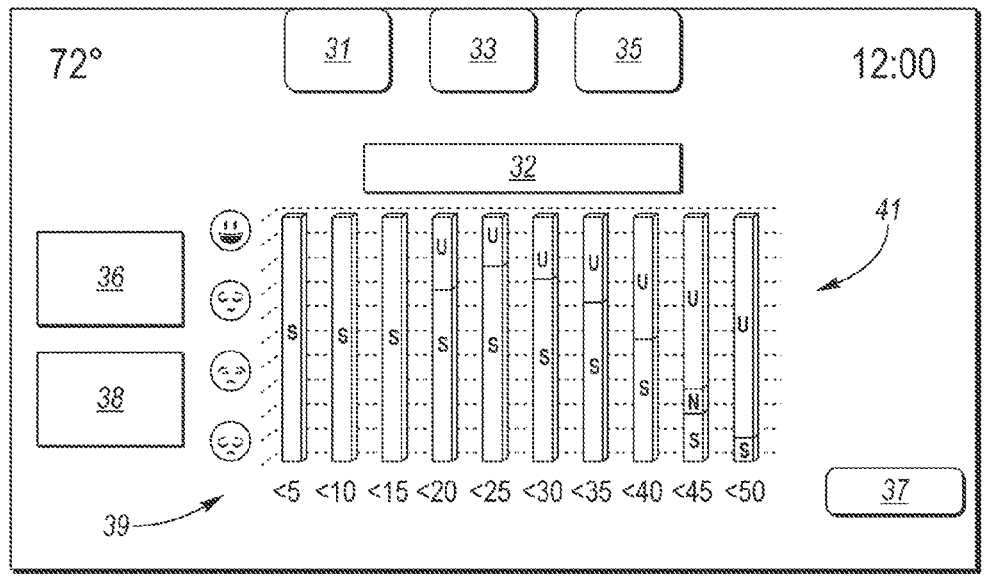
FIGS. 4A and 4B are schematic illustrations of example third screens of the interactive user interface depicting range data status.
Figure 4B:
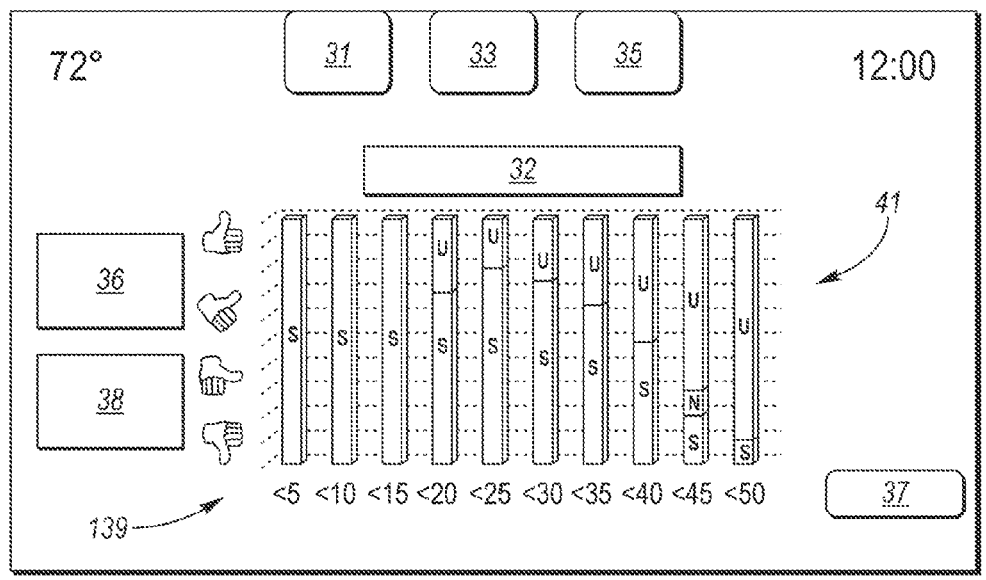

As shown in the bottom right corner of FIG. 3, a details icon (D) may be displayed on the display screen 42. Selection of the details icon (D) may bring up a detailed information screen, with two possible examples depicted in FIGS. 4A-B, both of which illustrate an example of miles traveled from a full battery charge using a bar graph having a plurality of bars 41 and corresponding indicia 39 or 139 of the filled/empty range of each bar 41, e.g., emoticons or other cartoon illustrations as shown. Each bar 41 thus corresponds to one of the data bins. With respect to FIGS. 4A-B, for instance, the distance traveled may be divided into data bins, e.g., travel distance ranges relative to a full charge as shown. As drivers tend to operate within a particular range of a home or other preferred charging station, some data bins may be populated with sufficient and timely data, with the satisfactory amount of data indicated by "S" in FIGS. 4A and 4B. Satisfactory bins may be color-coded in an embodiment, for instance by rendering the S region in green or another suitable color.

Due to lack of operating the vehicle 10 in various battery state of charge regions or ranges, the corresponding data bins may accumulate insufficient data over time, thus rendering the data unsatisfactory either in terms of the amount or the timeliness of the data. The unsatisfactory amount of data is indicated by "U" in FIGS. 4A and 4B, and may likewise be color-coded, e.g., in gray. Optionally, newly-collected data from the prior-completed task or mission may be depicted, e.g., as indicated by "N". Additional icons 31, 33, and 35 may be arranged on the user interface 42 to enable the operator to exit to another application such as audio, phone, or navigation screens, respectively. Icons 36 and 38 may be used to select other possible detail or history screens, or to enter an optional interactive virtual or actual reward feature, an example of which is shown in FIG. 5.

Figure 5:
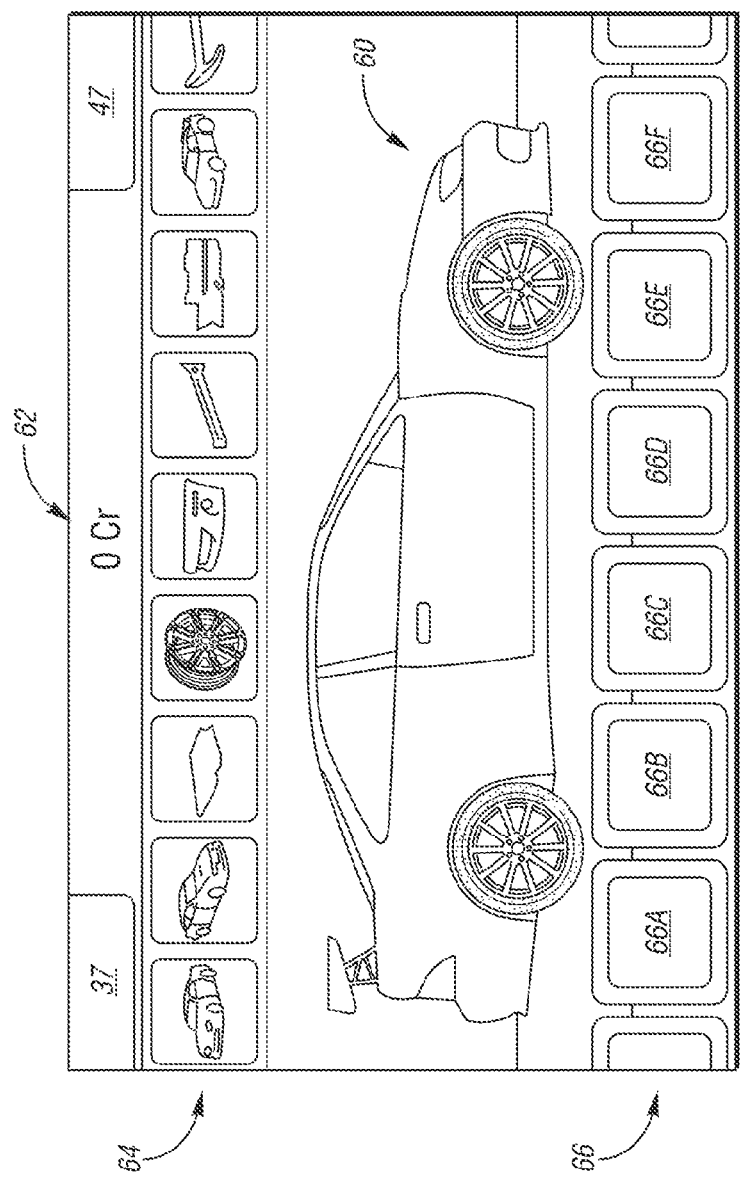
FIG. 5 is a schematic illustration of an example optional reward screen of the interactive user interface.

Referring to FIG. 5, the operator of the vehicle 10 of FIG. 1 may be optionally rewarded or incentivized to participate in the collection of battery performance data for use by the battery degradation monitoring logic 30 in a variety of ways. For example, the controller 50 may be programmed to display a real or virtual reward feature in response to completion of an assigned task. By way of an example, the operator may be presented with an image of a virtual object 60, e.g., a vehicle as shown, that the operator can gradually customize via completion of an assigned task. Completion of a task can be rewarded with a predetermined number of credits (Cr), the total of which may be displayed as indicated at 62. The operator can then exchange the awarded credits for a virtual component 64. Virtual components 64 may require exchange of a corresponding number of credits, and may include, for the non-limiting example virtual vehicle shown in FIG. 5, e.g., new rims, racing stripes, flames, or other decals, spoilers, lights, suspension kits, window tinting, badges, or other components. The operator may be able to select a desired color 66 from a scrolling list of color tiles 66A-F, each having a different color. An icon 47 may be displayed for "purchasing" a selected one of the virtual components 64, and a "back" icon 37 may be displayed allowing the operator to return to the previous screen.

Other possible embodiments of FIG. 5 may be envisioned within the scope of the disclosure. In a possible alternative embodiment, the credits (Cr) could be exchanged for services or product discounts, such as discounted vehicle service or restaurant discounts. The virtual components 64 may be components of a non-vehicular system such as an object or customizable avatar in other embodiments. Non-limiting examples of such objects or characters may include buildings, people, cartoon characters, and the like, any of which could be gradually outfitted or equipped with suitable virtual components 64 such as clothing or components as the operator completes assigned tasks.

Figure 6:
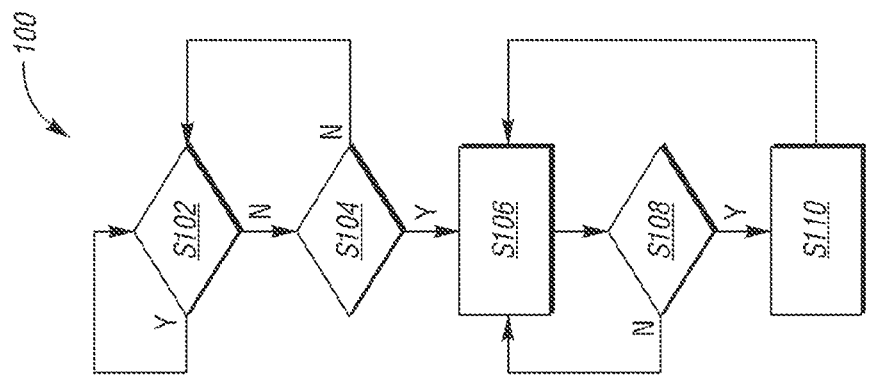
FIG. 6 is a flow chart describing an example method for monitoring battery degradation according to the present disclosure.

FIG. 6 depicts an example embodiment of the method 100 for execution by the controller 50. As noted above, the controller 50 is programmed to identify predetermined "data bins" indexed by state of charge ranges that are usable by the battery degradation monitoring logic 30 and that have missing and/or stale battery performance data, and to automatically prompt an operator via the interactive user interface 42 or 142 to execute an assigned task corresponding to the identified data bins. The controller 50 then records the measured performance parameters of the battery 12 after completing the assigned task, and uses the recorded measured performance parameters to estimate the state of the battery 12 using the battery degradation logic 30.

An example embodiment of the method 100 begins with step S102, wherein the controller 50 of FIG. 1 determines if the battery performance data available to the battery degradation monitoring logic 30 is complete, i.e., is not missing or stale. Step S102 may entail evaluating a plurality of battery data bins each corresponding to a predetermined state of charge range to determine if sufficient battery performance data has been collected for each data bin, and that the data in the data bins was collected within a predetermined amount of time and is thus timely. That is, data collected into a particular data bin when the battery 12 was new, e.g., an OCV of the battery 12 at an example data bin of 0-5% state of charge or 0 to 5 miles of driving from a full charge, may not be a useful predictor of battery charge capacity a few years later when the battery 12 has aged. Therefore, the controller 50 can compare the existing data to age and other objective thresholds to determine if the battery performance data available to the battery degradation monitoring logic 30 is complete. Step S102 may repeat in a loop when the battery performance data is complete, with the method 100 continuing to step S104 when any portion of the battery performance data is determined by the controller 50 to be incomplete or unsatisfactory, e.g., as labeled "U" in the example mileage-based data bins FIGS. 4A-B.

Step S104 may include detecting selection of the icon 22 of FIG. 2, which again may be displayed via the interactive user interface 42 or 142. Step S102 may repeat when the operator does not select icon 22, or otherwise indicate a willingness to participate in interactive collection of additional battery performance data according to method 100. The method 100 proceeds to step S106 when the operator selects the icon 22.

At step S106, the controller 50 and/or interactive user interface 42, 142 automatically generate a task corresponding to an unsatisfactory data bin, which is then communicated to the operator as a prompt. For example, the assigned task may be a drive task in which the operator is instructed to drive the vehicle a predetermined distance to deplete the battery to a predetermined state of charge, and/or to leave the vehicle 10 off for a predetermined amount of time. The task may be a charging task in which the operator is instructed not to charge the battery 12, or to approve a delay in charging of the battery 12 by a predetermined time after plugging in the battery 12. Optionally, hands-free operation may be used such that display of text is accompanied by voice prompts responsive to voice commands using voice-activated technology that is well known in the art. An advertisement may be displayed as part of the prompt, e.g., to direct the operator to a particular location, possibly in conjunction with a location search. The method 100 then proceeds to step S108.

Step S108 includes determining whether the operator has accepted the task prompt from step S106, e.g., by detecting a touch input to the display screen 42 or 142. If the operator declines the task, the method 100 may return to step S106 and select a different task, or exit out of the method 100 at the discretion of the operator. The method 100 proceeds to step S110 when the operator accepts the task.

At step S110, the controller 50 collects the battery performance data for the associated data bin corresponding to the task that was accepted at step S108. Step S110 may include processing the information from the battery sensors $S_x$ of FIG. 1, thereby collecting OCV data or other suitable data to "fill" or update data in an underutilized data bin. Step S110 may include estimating the remaining energy or other state of the battery 12 using the recorded measured battery performance data from the battery sensors $S_x$ using the battery degradation monitoring logic 30, and thereafter execute a control action with respect to the vehicle 10 or other system using the battery 12 using the estimated state. Example control actions may include displaying an estimated electric range via the user interface 42 or 142, thereby, reducing operator range anxiety, or controlling the powertrain of the vehicle 10 in a particular manner using the estimated electric range, e.g., by changing the operating mode or the combination of electric and gasoline-generated torque. The method 100 may then return to step S106 and repeat anew with a new task, or exit at the discretion of the operator.

The method 100 as described above makes it possible to alert an operator to opportunities for completing objectives or tasks that ultimately optimize the accuracy of the battery state prediction algorithms used to determine EV range. The approach could be further customized with an ability to apply intelligence to the assignment of tasks. For instance, on a weekday evening at the end of a typical business day, the operator may be presented with appealing trips, such as "try a restaurant in downtown Milford", or "beautiful day to go to Kensington park." The operator could be instructed to do something out of their routine, such as depleting the battery 12 almost completely before plugging in at the end of the day.

In an alternative embodiment, when the operator performs a location search, the objectives or tasks assigned by the controller 50 may be assigned in conjunction with the parameters of the location search. For instance, if an operator searches for a particular type of restaurant, the controller could assign the task at step S106 such as "drive to restaurant X at location Y" to prompt the operator to drive a certain distance, thus ensuring that the operator is able to visit the restaurant of her choice while still completing an assigned task. To facilitate the task, the controller 50 may be programmed to display an advertisement via the interactive user interface 42, 142 as part of the prompted task. For instance, the controller 50 could display an advertisement to accompany the location search and encourage the operator to drive a little farther, or perhaps visit a different establishment depending on assigned task. Such an embodiment could enable monetization of the method 100 in addition to facilitating optimization of the battery degradation logic 30.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

The invention claimed is:

1. A system for monitoring degradation of a battery, the system comprising:
   sensors operable for measuring battery performance data of the battery;
   an interactive user interface; and
   a controller in communication with the interactive user interface that is programmed to estimate a state of the battery, wherein the controller is in communication with the sensors and the interactive user interface, and is further programmed to:

identify, from a plurality of data bins each configured to store the measured battery performance data for a predetermined state of charge range, data bins that are missing battery performance data or contain stale battery performance data;

automatically prompt an operator, via the interactive user interface, to execute an assigned task corresponding to the identified data bins;

record the measured battery performance data for the identified data bins upon completion of the assigned task;

estimate the state of the battery using the recorded measured battery performance data; and execute a control action with respect to the system using the estimated state of the battery.

2. The system of claim 1, wherein the sensors include a voltage sensor operable for detecting an open-circuit voltage of the battery, and wherein the battery performance data includes the open-circuit voltage.

3. The system of claim 1, wherein the system is part of a vehicle, and wherein the controller is programmed to estimate a remaining electric range of the vehicle and display the estimated remaining electric range via the interactive user device as the control action.

4. The system of claim 3, wherein the assigned task is a drive task in which the operator is instructed to drive the vehicle a predetermined distance to deplete the battery to a predetermined state of charge.

5. The system of claim 3, wherein the assigned task is a charging task in which the operator is instructed not to charge the battery, or to approve a delay in charging of the battery by a predetermined time after plugging in the battery.

6. The system of claim 1, wherein the controller is programmed to display a bar graph having a plurality of bars each corresponding to one of the data bins, and to display corresponding indicia of a range of the plurality of bars.

7. The system of claim 1, wherein the controller is programmed to display a reward feature in response to completion of the assigned task.

8. The system of claim 7, wherein the controller is programmed to display a virtual object via the interactive user interface, and wherein the reward feature includes a virtual component for the virtual object.

9. The system of claim 8, wherein the virtual object is a virtual vehicle and the virtual component includes a virtual vehicle component.

10. The system of claim 7, wherein the reward feature includes a coupon for a free or discounted product or service.

11. The system of claim 1, wherein the controller is programmed to display an advertisement via the interactive user interface as part of the prompt of the operator.

12. A method for monitoring degradation of a battery in a system having a controller and battery sensors operable for measuring battery performance data of the battery, the method comprising:

determining, via a controller, if the measured battery performance data is missing or stale, including evaluating a plurality of data bins configured to store the measured battery performance data for a predetermined state of charge range to determine if the battery performance data has been measured for each of the data bins;

displaying, via the interactive user interface, an assigned task corresponding to a data bin in which the battery performance data is missing or stale to thereby automatically prompt an operator to execute the assigned task;

detecting whether an operator has accepted the displayed assigned task;

recording, via the controller, the battery performance data from the battery sensors for the data bin corresponding to the accepted assigned task in response to detecting whether the operator accepted the displayed assigned task;

estimating a state of the battery using the recorded battery performance data; and executing a control action with respect to the system using the estimated state.

13. The method of claim 12, wherein detecting whether an operator has accepted the displayed assigned task includes detecting a touch input to a display screen of the interactive user interface.

14. The method of claim 12, wherein recording the battery performance data includes measuring an open-circuit voltage of the battery using the battery sensors.

15. The method of claim 12, wherein the system is part of a vehicle, and wherein the control action includes displaying an estimated electric range of the vehicle via the interactive user device.

16. The method of claim 12, wherein displaying the assigned task includes displaying an icon on a display screen of the interactive user device, and wherein detecting whether an operator has accepted the displayed assigned task includes detecting whether the icon has been touched.

17. The method of claim 12, wherein the assigned task is a drive task in which the operator is instructed to drive the vehicle a predetermined distance to deplete the battery to a predetermined state of charge.

18. The method of claim 12, wherein the assigned task is a charging task in which the operator is instructed not to charge the battery, or to approve a delay in charging of the battery by a predetermined time after plugging in the battery.

* * * * *